United States Patent
Kohda

(10) Patent No.: US 9,325,867 B2
(45) Date of Patent: Apr. 26, 2016

(54) IMAGE FORMING APPARATUS AND IMAGE FORMING SYSTEM

(71) Applicant: KYOCERA Document Solutions Inc., Osaka (JP)

(72) Inventor: Isao Kohda, Osaka (JP)

(73) Assignee: KYOCERA DOCUMENT SOLUTIONS INC. (JP)

( * ) Notice: Subject to any disclaimer, the term of this patent is extended or adjusted under 35 U.S.C. 154(b) by 0 days.

(21) Appl. No.: 13/693,193

(22) Filed: Dec. 4, 2012

(65) Prior Publication Data

US 2013/0148148 A1 Jun. 13, 2013

(30) Foreign Application Priority Data

Dec. 8, 2011 (JP) .................................. 2011-269031
Aug. 9, 2012 (JP) .................................. 2012-176914

(51) Int. Cl.
*G06K 1/00* (2006.01)
*H04N 1/00* (2006.01)

(52) U.S. Cl.
CPC ......... *H04N 1/00392* (2013.01); *H04N 1/0044* (2013.01)

(58) Field of Classification Search
None
See application file for complete search history.

(56) References Cited

U.S. PATENT DOCUMENTS

| 6,285,842 | B1* | 9/2001 | Katamoto et al. | 399/81 |
|---|---|---|---|---|
| 2002/0030634 | A1* | 3/2002 | Noda et al. | 345/5 |
| 2002/0055955 | A1 | 5/2002 | Lloyd-Jones et al. | 707/512 |
| 2006/0232807 | A1* | 10/2006 | Ashton et al. | 358/1.12 |
| 2008/0295023 | A1* | 11/2008 | Matsumoto | 715/788 |
| 2009/0063960 | A1* | 3/2009 | Anwar | 715/255 |
| 2011/0029859 | A1* | 2/2011 | Igari | 715/234 |
| 2011/0222122 | A1* | 9/2011 | Murakami | 358/1.18 |
| 2012/0229857 | A1* | 9/2012 | Pinkerton | 358/1.18 |
| 2012/0250071 | A1* | 10/2012 | Miller et al. | 358/1.15 |
| 2013/0016366 | A1* | 1/2013 | Sawada et al. | 358/1.2 |

FOREIGN PATENT DOCUMENTS

| JP | 2002-55748 | 2/2002 |
|---|---|---|
| JP | 2006-231651 | 9/2006 |
| JP | 2009-141412 | 6/2009 |
| JP | 2010-219763 | 9/2010 |
| JP | 2010-232869 | 10/2010 |

\* cited by examiner

*Primary Examiner* — Helen Q Zong
(74) *Attorney, Agent, or Firm* — Ostrolenk Faber LLP

(57) ABSTRACT

An image forming apparatus includes a control unit configured to cause a document image on a display screen of a display unit to be preview-displayed based on a document image data and cause an icon indicating various sizes of printing papers to be displayed, when a movement manipulation of the icon onto the document image based on a manipulation signal is detected, cause a frame according to a size of a printing paper indicated by the icon to be displayed while overlapping the document image and recognize a region surrounded by the frame as a printing region, and control the print unit such that an image of the printing region is printed on the printing paper indicated by the icon, which is movement-manipulated, when a print instruction is received.

5 Claims, 7 Drawing Sheets

IMAGE FORMING APPARATUS AND IMAGE FORMING SYSTEM

CROSS-REFERENCE TO RELATED APPLICATION

This application claims priority from Japanese Patent Application No. 2011-269031 filed on Dec. 8, 2011, and Japanese Patent Application No. 2012-176914 filed on Aug. 9, 2012, the contents of which are incorporated herein by reference in their entirety.

BACKGROUND OF THE DISCLOSURE

1. Field of the Disclosure

The present disclosure relates to an image forming apparatus and an image forming system.

2. Description of Related Art

From the related art, an image forming apparatus having a function of preview-displaying an image of a document (a document image) read by a document reading unit on a display unit is already known. For example, an image forming apparatus having a function of recognizing a rectangular region whose diagonal line is defined by two points as an image region to be printed (a trimming region), when a manipulation of designating the two points on a document image preview-displayed on a display unit is performed, is disclosed.

In the related art, in order to set the trimming region, a user should perform complex manipulations of pressing a first point designation button displayed on a touch panel-attached display unit and then designating a first point on the document image in the preview display, subsequently, pressing a second point designation button displayed on the same display unit and then designating a second point on the document image, and so on.

SUMMARY OF THE DISCLOSURE

In consideration of the above-mentioned circumstances, it is an object of the present disclosure to provide an image forming apparatus and an image forming system that enables users to designate a desired printing region (an image region to be printed) by an easy manipulation without being aware of a task such as trimming.

In order to solve above mentioned problems, an image forming apparatus of a first aspect of the present disclosure includes a display unit configured to display a predetermined image; a manipulation unit configured to output a manipulation signal according to a manipulation performed on a display screen of the display unit; a document reading unit configured to generate document image data indicating a document image obtained by reading a document; a print unit configured to print an image on a printing paper and output the printed paper as a printed matter; and a control unit configured to control the print unit, wherein the control unit causes the document image on the display screen of the display unit to be preview-displayed based on the document image data and causes an icon indicating various sizes of printing papers to be displayed, when a movement manipulation of the icon onto the document image is detected based on the manipulation signal, causes a frame according to a size of a printing paper indicated by the icon to be displayed while overlapping the document image and recognizes a region surrounded by the frame as a printing region, and controls the print unit such that an image of the printing region is printed on the printing paper indicated by an icon, which is movement-manipulated, when a print instruction is received.

In addition, an image forming system of a second aspect of the present disclosure includes an image forming apparatus configured to print an image onto a printing paper and output the printed paper as a printed matter; a host apparatus configured to output a print instruction to the image forming apparatus; and a communication line configured to connect the host apparatus and the image forming apparatus to each other, and the host apparatus includes a display unit configured to display a predetermined image; a manipulation unit configured to output a manipulation signal according to a manipulation performed on a display screen of the display unit; a storage unit configured to store image data of an image to be printed; and a control unit configured to cause the image on the display screen of the display unit to be preview-displayed based on the image data and cause an icon indicating various sizes of printing papers to be displayed, when a movement manipulation of the icon onto the image is detected based on the manipulation signal, cause a frame according to a size of a printing paper indicated by the icon to be displayed while overlapping the image and recognizes a region surrounded by the frame as a printing region, and output the print instruction such that an image of the printing region is printed on the printing paper indicated by an icon, which is movement-manipulated.

According to the present disclosure, as a user moves an icon indicating a size of a desired printing paper onto the preview-displayed document image on the display screen of the display unit, the printing region can be easily and intuitively designated. That is, according to the present disclosure, it is possible for users to designate a desired printing region by an easy manipulation without being aware of a task such as trimming.

DETAILED DESCRIPTION OF THE DISCLOSURE

First Embodiment

Hereinafter, an embodiment of the present disclosure will be described with reference to the accompanying drawings. In addition, hereinafter, as an image forming apparatus according to the present disclosure, a multifunction machine, which functions as a copy machine, a printer, a facsimile, and so on, will be exemplarily described.

Figure 1:
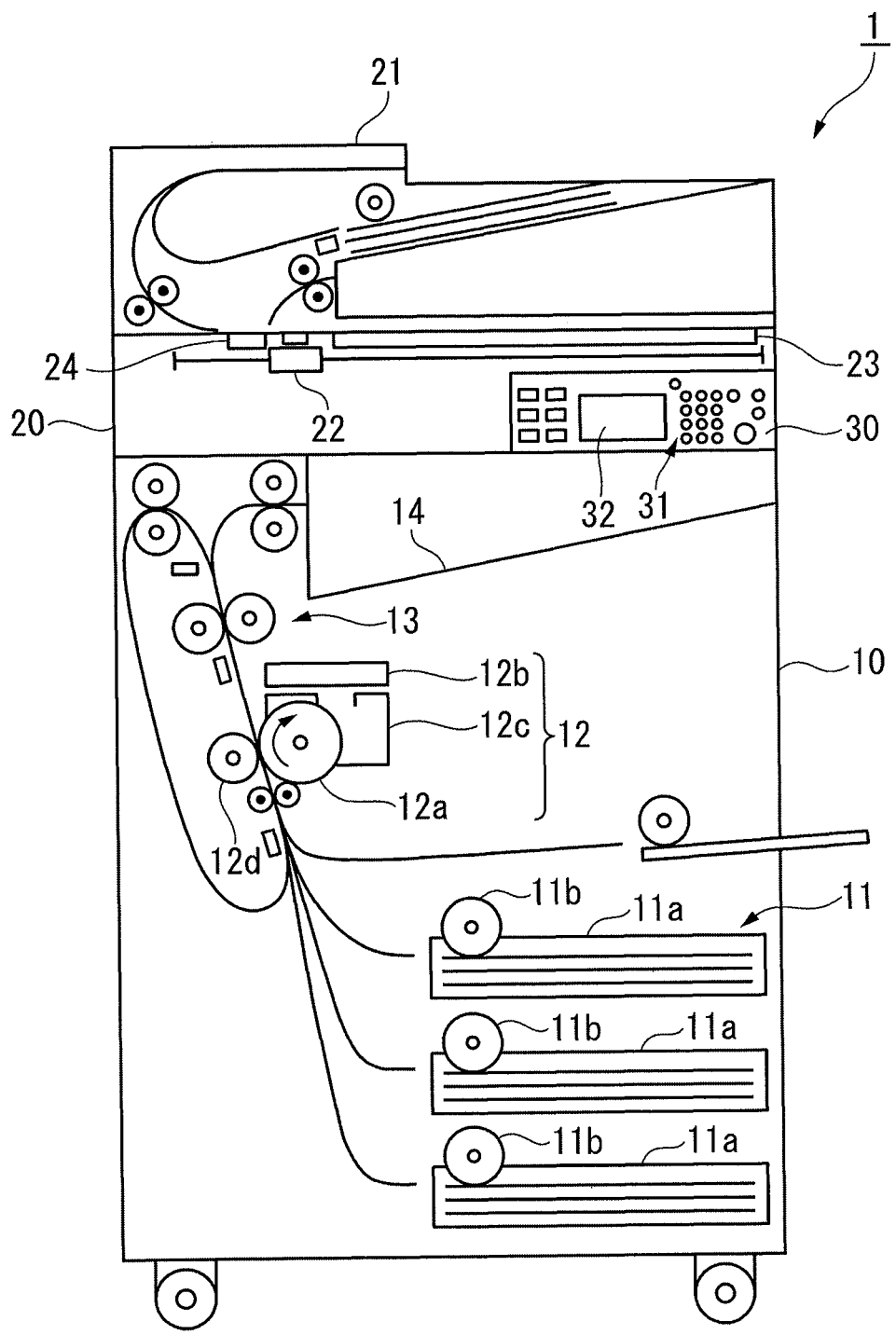
FIG. 1 is a front perspective view showing a configuration of major parts of a multifunction machine 1 of a first embodiment.
Figure 2:
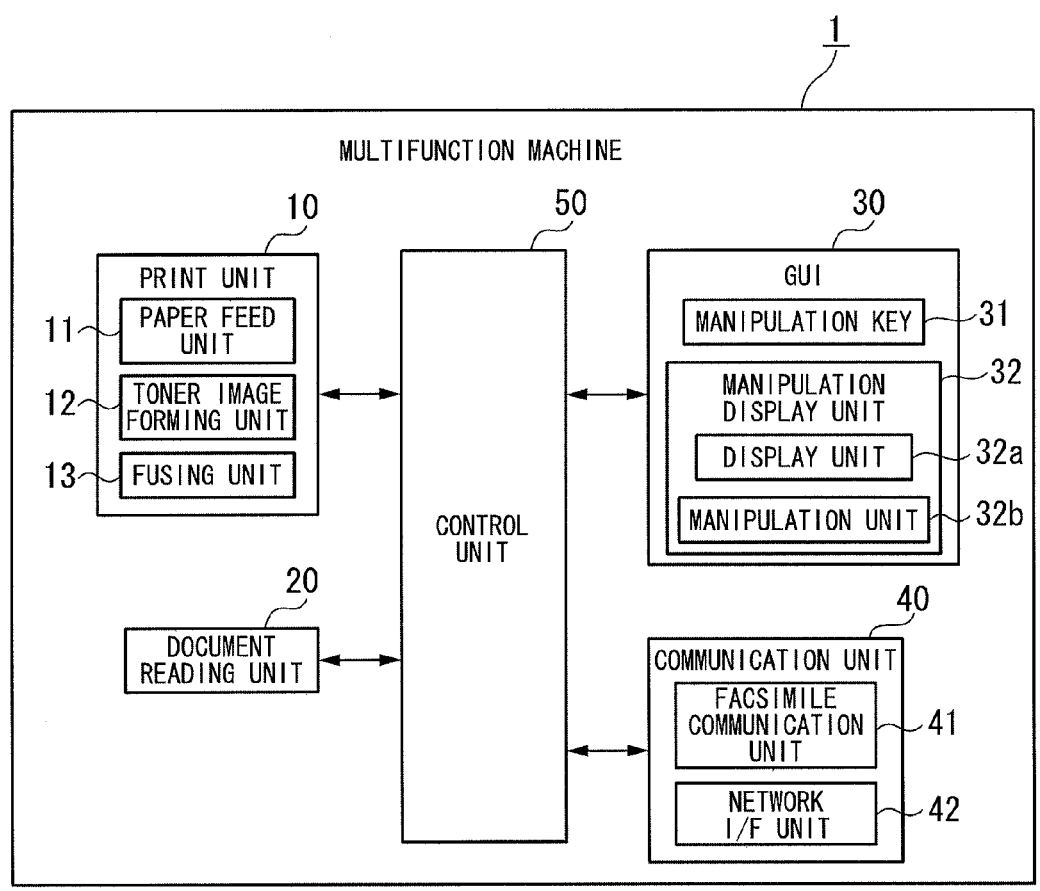
FIG. 2 is a functional block diagram of the multifunction machine 1 according to the first embodiment.

FIG. 1 is a front perspective view showing a configuration of major parts of a multifunction machine 1 according to the embodiment. FIG. 2 is a functional block diagram of the multifunction machine 1. As shown in the drawings, the multifunction machine 1 includes a print unit 10, a document reading unit 20, a GUI (graphical user interface) 30, a communication unit 40, and a control unit 50.

The print unit 10 prints an image on a printing paper to output the printing paper as a printed matter under control of the control unit 50, and includes a paper feed unit 11, a toner image forming unit 12, a fusing unit 13, a paper discharge tray 14, and so on. The paper feed unit 11 includes a plurality of paper feed cassettes 11a configured to accommodate a plurality of standard printing papers (for example, about several tens) and extract the paper feed cassettes from a front surface of the multifunction machine 1. The uppermost printing paper of the printing papers accommodated in the respective paper feed cassettes 11a is continuously discharged by driving of a pickup roller 11b to be conveyed to the toner image forming unit 12.

The toner image forming unit 12 forms a toner image on a printing paper according to an image to be printed, and includes a photoreceptor drum 12a, an exposure unit 12b, a development unit 12c and a transfer unit 12d, and so on. The photoreceptor drum 12a is a cylindrical photoreceptor configured to form an electrostatic latent image according to the image to be printed and support a developed toner image. The exposure unit 12b radiates a laser beam to the photoreceptor drum 12a to form an electrostatic latent image on a surface of the photoreceptor drum 12a.

The development unit 12c develops the electrostatic latent image to form a toner image by supplying toner to the photoreceptor drum 12a on which the electrostatic latent image is formed. The transfer unit 12d transfers the toner image supported by the photoreceptor drum 12a to the printing paper conveyed from the paper feed unit 11.

The fusing unit 13 fuses the toner image transferred (formed) by the toner image forming unit 12 to the printing paper by heating and pressing the toner image, and then discharges (outputs) the printing paper after the fusing processing to the paper discharge tray 14 as the printed matter on which the desired image is printed. The paper discharge tray 14 is a section configured to collect the printed matters output from the fusing unit 13 and installed on the print unit 10.

The document reading unit 20 reads the document set by a user, generates document image data indicating an image (a document image) of the document to output the data to the control unit 50, under control of the control unit 50, and includes an ADF (automatic document feeder) 21, a carriage 22, a document table 23, a document reading slit 24, and so on. The ADF 21 is an apparatus for sequentially and automatically feeding documents to be read. The carriage 22, on which an exposure lamp and a CCD (charge coupled device) sensor are mounted, reads the documents sequentially fed by the ADF 21 or the documents set on the document table 23.

Specifically, when the document set on the document table 23 is read, the carriage 22 moves in a longitudinal direction of the document table 23 and reads the document using the CCD sensor. On the other hand, when the document fed from the ADF 21 is read, the carriage 22 reads the documents sequentially fed from the ADF 21 using the CCD sensor via the document reading slit 24 at a position opposite to the document reading slit 24 (a position under the document reading slit 24).

The GUI 30 outputs a signal (a manipulation signal) according to the manipulation by the user to the control unit 50 and displays various information such as information indicating a state of the multifunction machine 1 according to the control of the control unit 50, and includes a manipulation unit 32b and a manipulation display unit 32. The manipulation unit 32b is a hard key such as a copy start key, a copy stop/clear key, a numeric keyboard (numeric keys), a function switching key, and so on. In addition, the function switching key is a key configured to switch the multifunction machine 1 to an operation mode of each of the functions when each of a copy function, a print function, a scan function and a facsimile function realized by the multifunction machine 1 is used by the user.

The manipulation display unit 32 includes a display unit 32a configured to display a predetermined image, and a manipulation unit 32b configured to output a manipulation signal according to the manipulation performed on the display screen of the display unit 32a to the control unit 50, under control of the control unit 50. In addition, the display unit 32a is, for example, a liquid crystal panel or an organic EL panel. Further, the manipulation unit 32b is, for example, a touch panel disposed opposite to the display screen of the display unit 32a, and outputs a signal indicating coordinates of a portion pressed by a user as the manipulation signal.

The communication unit 40 performs communication with an external instrument such as a facsimile of the other party, a personal computer, or the like, and includes a facsimile communication unit 41 and a network I/F section 42. The facsimile communication unit 41 is connected to a dial-up line to perform communication with the facsimile of the other party. The network I/F section 42 is connected to, for example, a LAN (a local area network), and performs communication with a terminal apparatus such as a personal computer or the like connected to the LAN.

The control unit 50 generally controls the entire operation of the multifunction machine 1 based on the manipulation signal input from the GUI 30 and the signal received from the external instrument via the communication unit 40. In addition, while this will be described more specifically below, the control unit 50 causes the document image to be preview-displayed on the display screen of the display unit 32a based on the document image data generated by the document reading unit 20 and causes icons indicating various sizes of printing papers to be displayed during the copy mode. When a movement manipulation of the icon onto the document image is detected based on the manipulation signal input from the manipulation unit 32b, the control unit 50 causes a frame according to the size of the printing paper indicated by the icon to be displayed while overlapping the document image, and recognizes a region surrounded by the frame as an image region to be printed (a printing region). When the print instruction is received, the control unit 50 controls the print unit 10 such that the image of the printing region is printed on the printing paper indicated by the movement-manipulated icon.

Hereinafter, operations of the multifunction machine 1 configured as above mentioned will be described.

Figure 3:
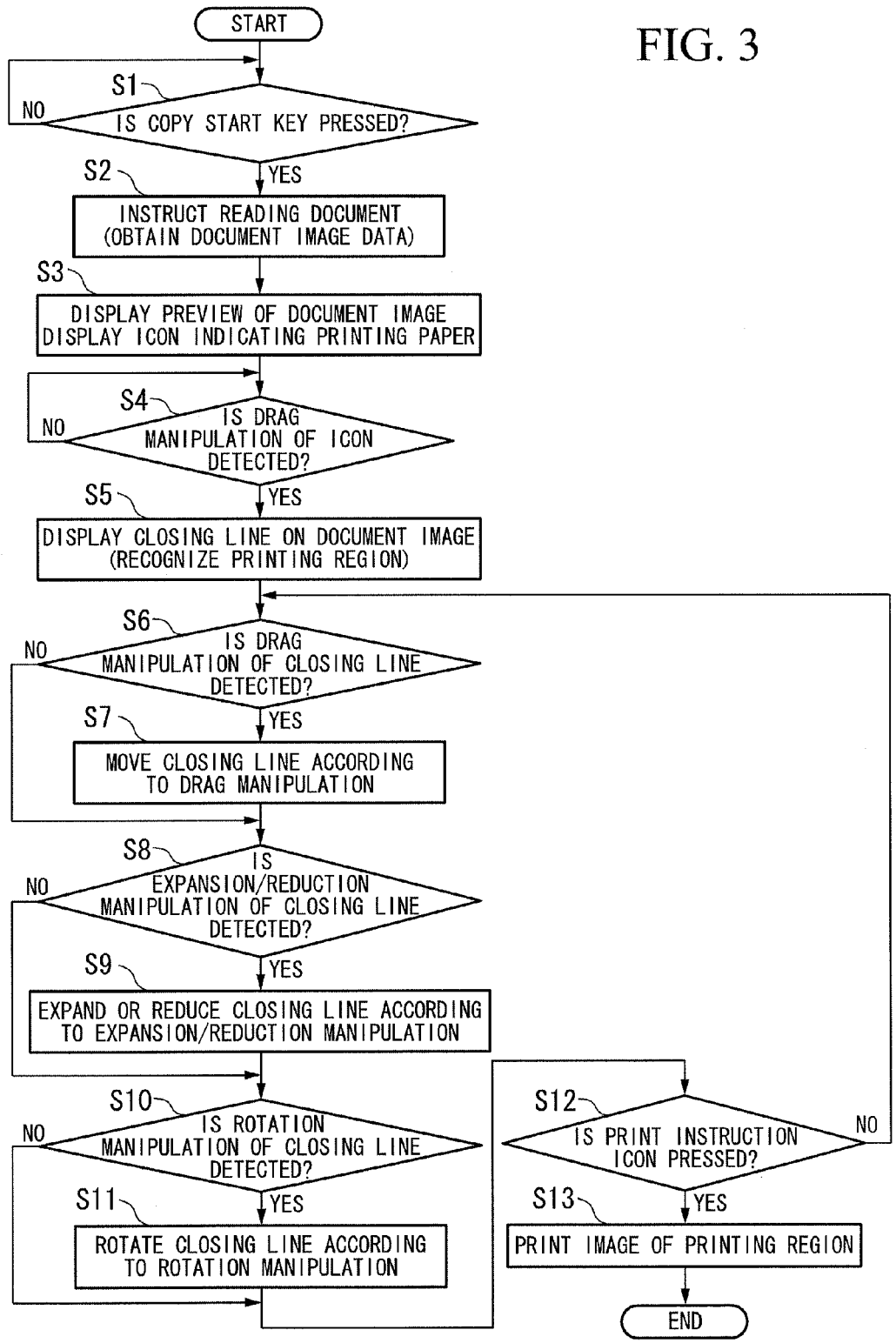
FIG. 3 is a flowchart showing operations of the multifunction machine 1 during a copy mode (specifically, a sequence of various processing performed by a control unit 50 during the copy mode).

FIG. 3 is a flowchart showing operations of the multifunction machine 1 during a copy mode (specifically, a sequence of various processing performed by the control unit 50 during the copy mode). As shown in FIG. 3, during the copy mode, the control unit 50 determines whether the copy start key is pressed based on the manipulation signal input from the manipulation unit 32b (step S1), and in the case of "Yes" instructs the document reading unit 20 to read the document (step S2).

As described above, when the reading instruction of the document is received from the control unit 50, the document reading unit 20 reads the document set in the ADF 21 or the document table 23 and generates document image data indicating the document image to output the document image data to the control unit 50. Accordingly, the document image data read by the document reading unit 20 is stored in an internal memory of the control unit 50.

Figure 4A:
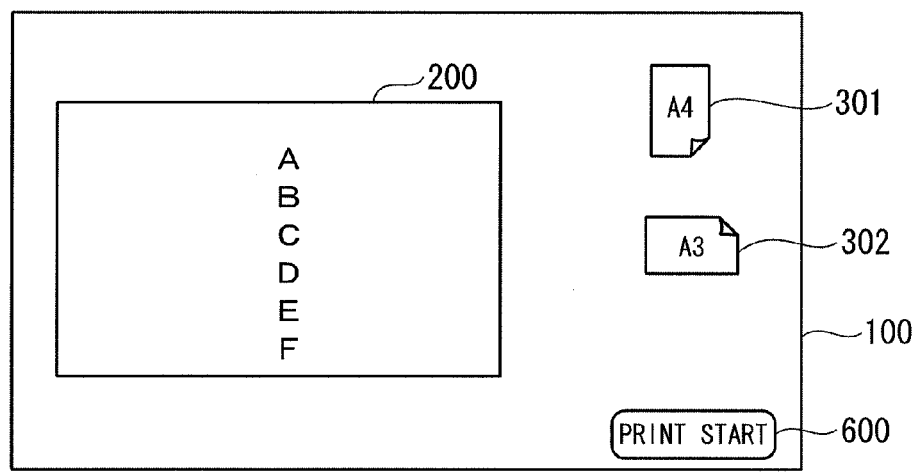
FIGS. 4A to 4C are first views showing a display example on a display screen 100.

Next, the control unit 50 controls the display unit 32a based on the document image data stored in the internal memory, and causes the document image to be preview-displayed on the display screen of the display unit 32a and causes the icon indicating the various sizes of printing papers to be displayed (step S3). FIG. 4A shows an example of a document image 200 displayed on a display screen 100 of the display unit 32a and icons 301 and 302 indicating various sizes of printing papers by processing in step S3. In addition, the icon 301 indicates a vertical A4 size printing paper, and the icon 302 indicates a horizontal A3 size printing paper. In addition, reference numeral 600 is a print instruction icon for transmitting a print instruction to the control unit 50.

Next, the control unit 50 determines whether a movement manipulation (a drag manipulation) of the icon 301 or 302 onto the document image 200 is detected based on a manipulation signal input from the manipulation unit 32b (a signal indicating coordinates of a portion pressed on the touch panel by a user) (step S4).

Hereinafter, as an example, a case in which the control unit 50 detects the drag manipulation of the icon 301 will be described.

Figure 4B:
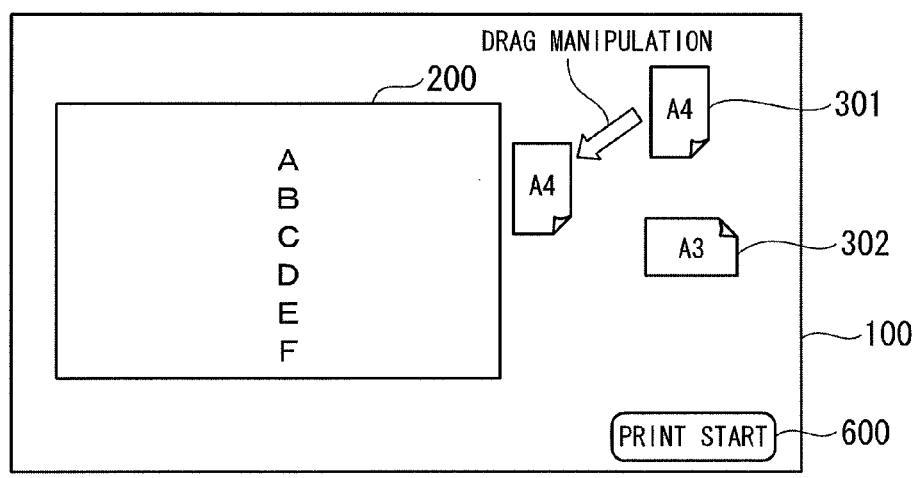

The control unit 50 controls the display unit 32a such that if the icon 301 moves on the display screen 100 according to the drag manipulation in the case of "Yes" in step S4 (for example, when the drag manipulation of the icon 301 is detected) (see FIG. 4B), the control unit 50 causes a frame 400 according to the size of the printing paper indicated by the icon 301 to be displayed while overlapping the document image 200 at a movement position of the icon 301 on the document image 200, and recognizes a region surrounded by the frame 400 as an image region to be printed (a printing region 500) (step S5).

Figure 4C:
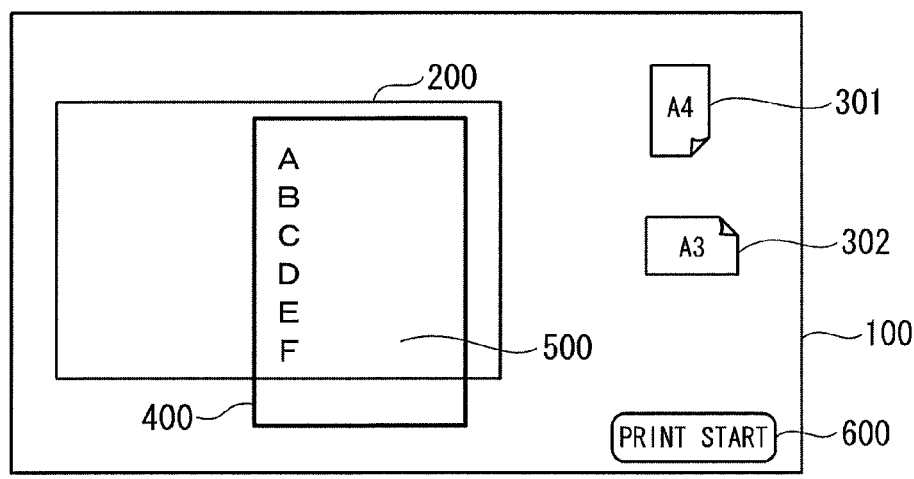

FIG. 4C shows an example of the frame 400 displayed overlapping the document image 200 on the display screen 100 of the display unit 32a. While the document image 200 displayed on the display screen 100 is an image of an original document image read through the document reading unit 20 reduced by a certain magnification to fit in the display screen 100, lengthwise and widthwise sizes of the frame 400 (a size of the printing region 500) are the same size as a vertical A4 size printing paper reduced by the same magnification as the document image 200.

Figure 5A:
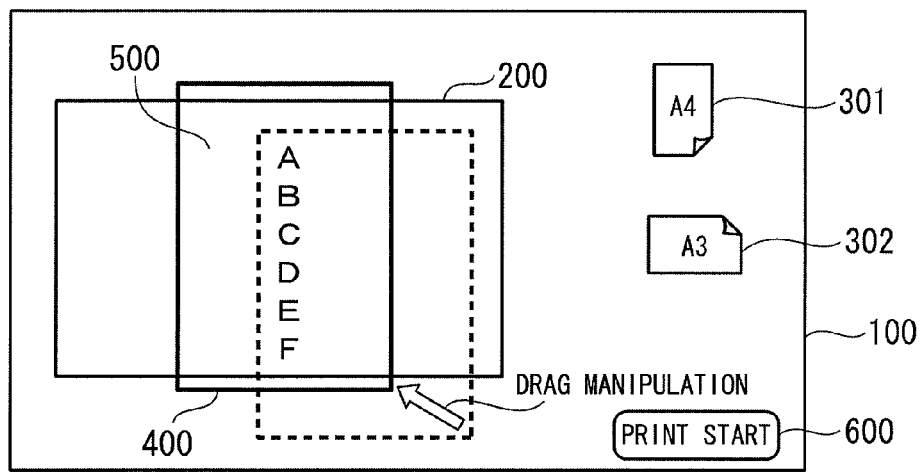
FIGS. 5A to 5C are second views showing a display example on the display screen 100.

Next, the control unit 50 determines whether a drag manipulation of the frame 400 displayed overlapping the document image 200 is detected based on the manipulation signal input from the manipulation unit 32b (step S6), performs step S8 in the case of "No" and in the case of "Yes" as shown in FIG. 5A, controls the display unit 32a such that the frame 400 is moved according to the drag manipulation of the frame 400 (step S7).

Figure 5B:
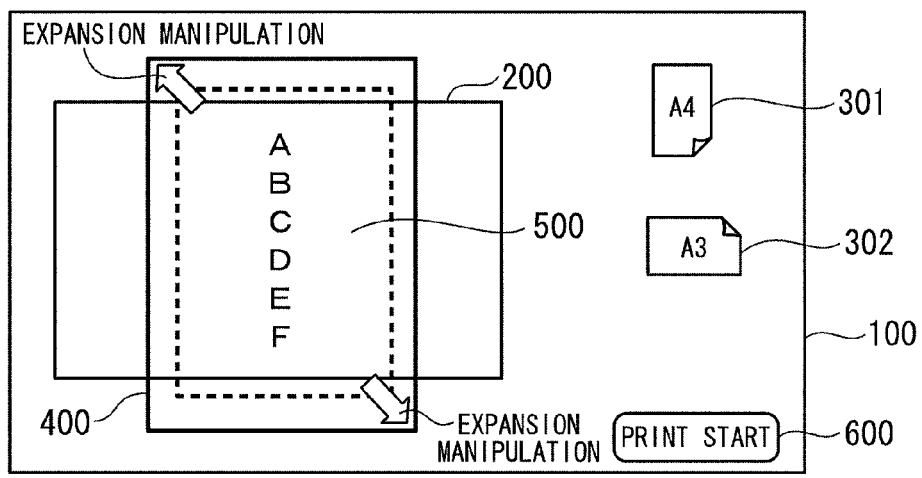

Next, the control unit 50 determines whether an expansion manipulation or a reduction manipulation of the frame 400 displayed while overlapping the document image 200 is detected based on the manipulation signal input from the manipulation unit 32b (step S8), performs step S10 in the case of "No" and in the case of "Yes" as shown in FIG. 5B, controls the display unit 32a such that the frame 400 is expanded or reduced according to the expansion manipulation or the reduction manipulation of the frame 400 (step S9). Here, the expansion manipulation means a manipulation of dragging two angles on the diagonal line of the frame 400 outward, and the reduction manipulation means a manipulation of dragging two angles on the diagonal line of the frame 400 inward. In addition, FIG. 5B exemplarily shows the case in which the expansion manipulation of the frame 400 is performed.

Figure 5C:
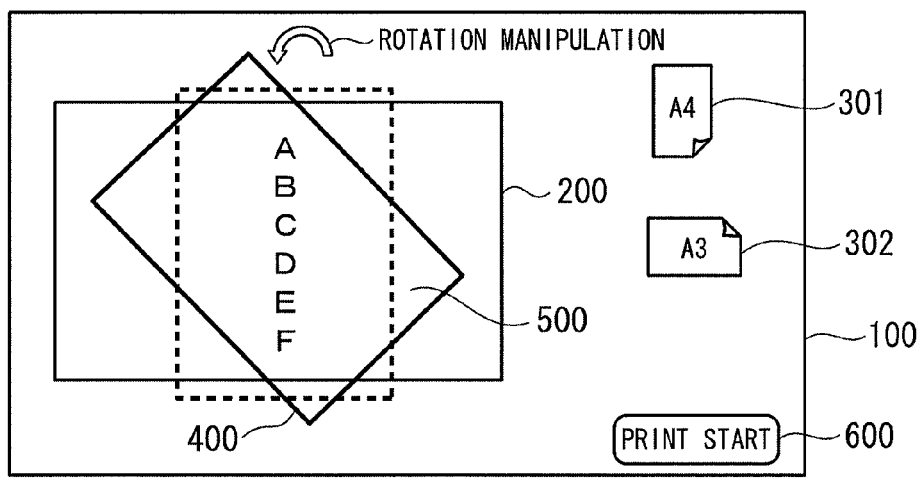

Next, the control unit 50 determines whether a rotation manipulation of the frame 400 displayed while overlapping the document image 200 is detected based on the manipulation signal input from the manipulation unit 32b (step S10), performs step S12 in the case of "No" and in the case of "Yes" as shown in FIG. 5C, controls the display unit 32a such that the frame 400 is rotated according to the rotation manipulation of the frame 400 (step S11). Here, the rotation manipulation means a manipulation of dragging at least one angle of the frame 400 along an arc shape.

Then, the control unit 50 determines whether a print instruction icon 600 displayed on the display screen 100 is pressed based on the manipulation signal input from the manipulation unit 32b (whether a print instruction is received) (step S12), returns to step S6 in the case of "No" and in the case of "Yes" controls the print unit 10 such that an image of the printing region 500 is printed on a printing paper (in this case, a vertical A4 size printing paper) indicated by the icon 301, which is movement-manipulated (step S13).

In addition, when the expansion manipulation or the reduction manipulation of the frame 400 is performed, just lengthwise and widthwise sizes of the frame 400 are varied, i.e., just the lengthwise and widthwise sizes of the printing region 500 are varied, but the image itself of the printing region 500 is not expanded or reduced. Accordingly, for example, when the image is printed on the A4 size printing paper after the expansion manipulation of the frame 400, the image (characters, etc.) of the printing region 500 is reversely reduced and printed, and on the other hand, when the image is printed on the A4 size printing paper after the reduction manipulation of the frame 400, the image of the printing region 500 is reversely expanded and printed.

In addition, when the rotation manipulation of the frame 400 is performed, the image of the printing region 500 is not rotated by only rotating the frame 400. Accordingly, for example, after rotating the frame 400 leftward 45° with respect to the vertical axis of the display screen 100, when the image is printed on the A4 size printing paper, the image (characters, etc.) of the printing region 500 is reversely rotated rightward 45° with respect to the vertical axis of the printing paper and printed.

As described above, according to the embodiment, a user can easily and intuitively designate the printing region 500 by movement-manipulating the icon 301 or 302 disposed on the display screen 100 of the display unit 32a and indicating a desired size of printing paper onto the document image 200, which is preview-displayed. That is, according to the embodiment, the user can designate the desired printing region 500 through an easy manipulation without awareness of a task such as trimming.

In addition, according to the embodiment, designation of the size of the printing paper can be performed with designation of the printing region 500, and further, designation of the expansion or reduction of the image actually printed on the printing paper can be intuitively performed by the expansion manipulation or the reduction manipulation of the frame 400 without setting the magnification. Furthermore, according to the embodiment, designation of the rotation of the image actually printed on the printing paper can be intuitively performed by rotation-manipulating the frame 400, without setting a rotation angle. That is, according to the embodiment, manipulation performance of the multifunction machine 1 can be largely improved.

Second Embodiment

Next, a second embodiment of the present disclosure will be described. In the following description, like or same elements of the above-mentioned embodiment are designated by same reference numerals, and description thereof will be simplified or omitted.

Figure 6:
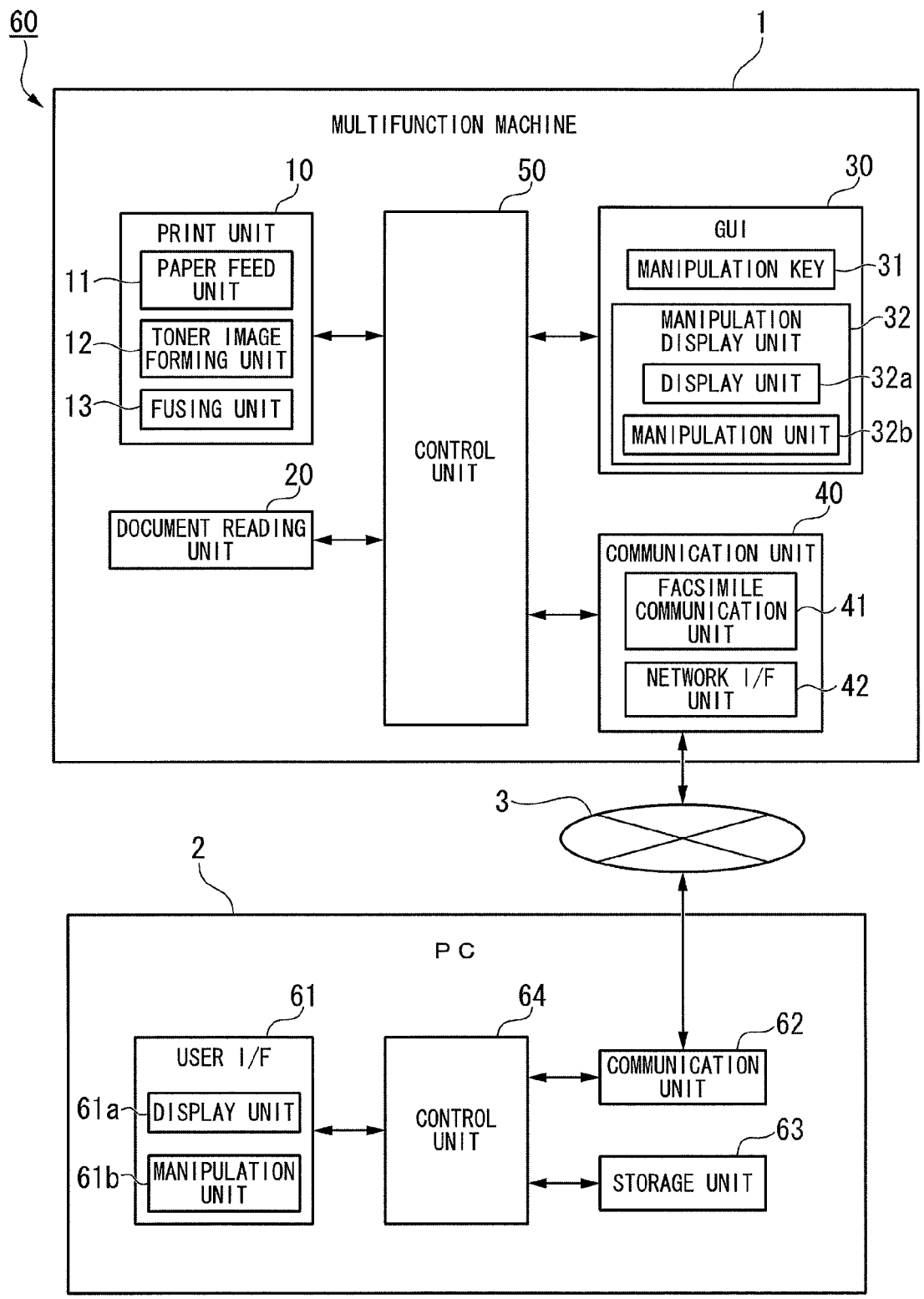
FIG. 6 is a functional block diagram of an image forming system 60 according to a second embodiment.

FIG. 6 is a functional block diagram of an image forming system 60 according to the second embodiment.

The image forming system 60 includes a multifunction machine 1 (an image forming apparatus), a personal computer 2 (a host apparatus) and a LAN (a communication line) 3 configured to connect the multifunction machine 1 and the personal computer 2.

In addition, in FIG. 6, while one personal computer 2 is shown, actually, a plurality of personal computers (not shown) are connected to the multifunction machine 1 via the LAN 3.

The personal computer 2 includes a user interface 61, a communication unit 62, a storage unit 63 and a control unit 64.

The user interface 61 includes a display unit 61a constituted by a liquid crystal display, an organic EL display, or the like. The display unit 61a displays an image for allowing the user to recognize an operating state of the personal computer 2 under the control of the control unit 64.

In addition, the user interface 61 includes a manipulation unit 61b constituted by a mouse, a keyboard, or the like. The manipulation unit 61b receives a manipulation instruction to the personal computer 2 from the user, and outputs a signal according to the manipulation instruction by the user to the control unit 64.

The communication unit 62 performs transmission and reception of various kinds of information from/to an external apparatus via the LAN 3 under the control of the control unit 64.

The storage unit 63 stores various kinds of application software, a driver for controlling various kinds of hardware connected to the personal computer 2, for example, a printer driver for transmitting an instruction of a user to the multifunction machine 1, or the like, various kinds of set values, and so on. In addition, the storage unit 63 stores image data of the image to be printed in the multifunction machine 1 (including image data input from the communication unit 62, the external memory, or the like, not only document image data read by the document reading unit 20).

The control unit 64 is constituted by an internal memory, a CPU (a central processing unit), and various kinds of input/output interface lines configured to perform data reception from the other units (that is, the user interface 61 and the storage unit 63, and so on), and controls all operations of the personal computer 2.

The internal memory stores a control program. The CPU generally controls the other units by performing controlled calculation based on the above mentioned control program or various kinds of control data, a signal input from the user interface 61, or the like.

The control unit 64 controls stored contents of the storage unit 63. In addition, the control unit 64 realizes a function of the application software or the printer driver by operations according to the application software stored in the storage unit 63 or program contents of the printer driver and a manipulation instruction of the user.

The control unit 64 causes the document image to be preview-displayed based on the document image data generated by the document reading unit 20 on the display screen of the display unit 61a and causes icons indicating various sizes of printing papers to be displayed during the copy mode. When the movement manipulation of the icon onto the document image is detected based on the manipulation signal input from the manipulation unit 61b, the control unit 64 causes the frame according to the size of the printing paper indicated by the icon to be displayed while overlapping the document image, and recognizes a region surrounded by the frame as an image region to be printed (a printing region). The control unit 64 outputs the print instruction such that the image of the printing region is printed on the printing paper indicated by the icon, which is movement-manipulated, and causes the multifunction machine 1 to print the image.

The LAN 3 is installed, for example, throughout the entire region of the same company in a wired or wireless manner and enables delivery of information within the company through transmission and reception of electronic data. Then, the multifunction machine 1 and the personal computer 2 are connected to each other in a communicable manner.

Hereinafter, the operation of the image forming system 60 as configured above will be described.

Figure 7:
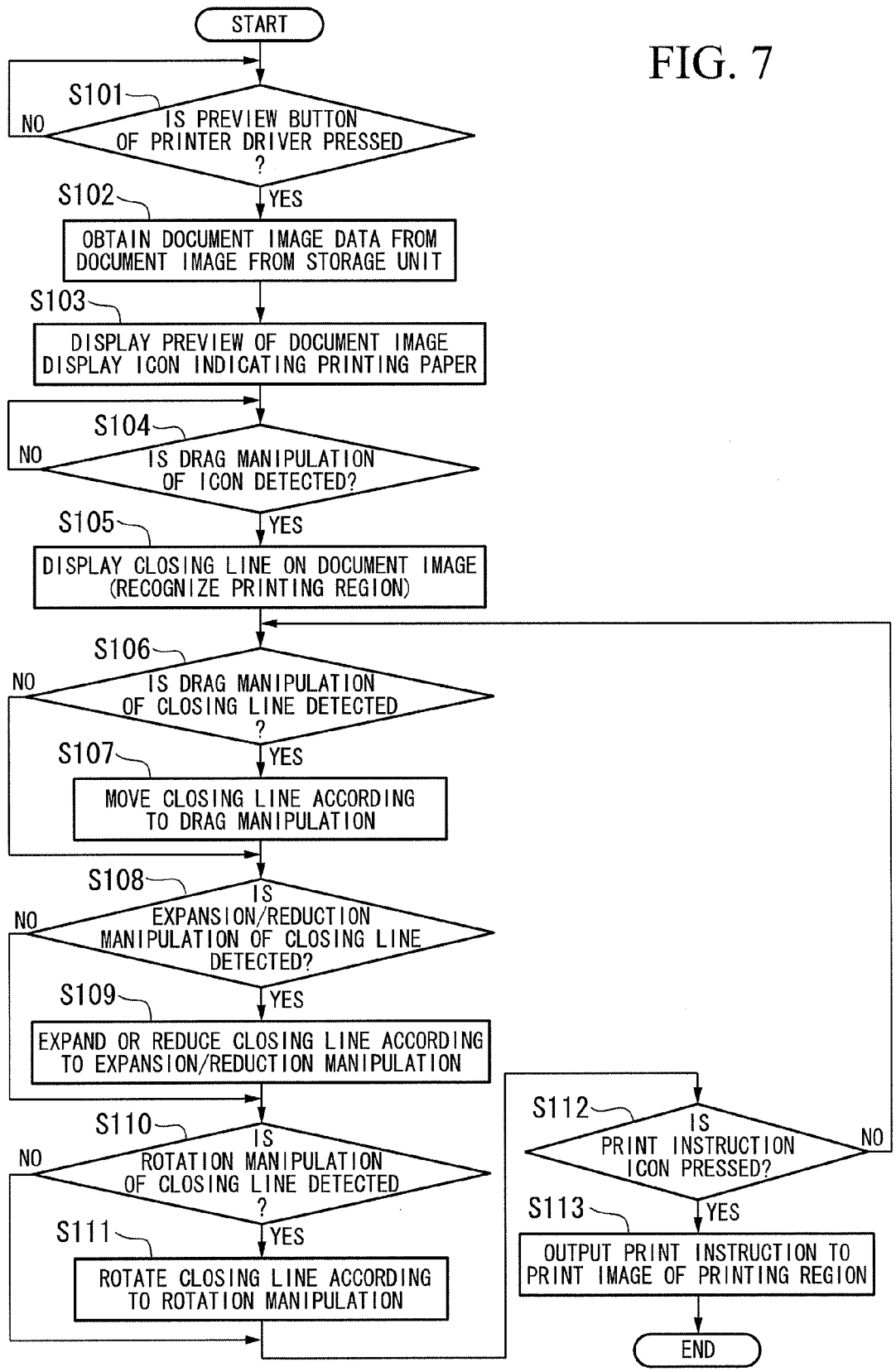
FIG. 7 is a flowchart showing operations of the image forming system 60 during a copy mode (specifically, a sequence of various processing which a control unit 64 causes a printer driver to perform during the copy mode).

FIG. 7 is a flowchart showing operations of the image forming system 60 upon during a copy mode (specifically, a sequence of various processing which a control unit 64 controls a printer driver to perform during the copy mode). As shown in FIG. 7, during the copy mode, the control unit 64 determines whether a preview button of a predetermined dialog of the printer driver is pressed based on the manipulation signal input from the manipulation unit 61b (for example, a mouse) (step S101), and in the case of "Yes" reads and obtains image data of the image to be printed previously stored in the storage unit 63 (here, a document image, which is previously read by, for example, the document reading unit 20) (step S102).

Next, the control unit 64 controls the display unit 61a, based on the image data stored in the storage unit 63, to cause the document image to be preview-displayed on the display screen of the display unit 61a, and causes the icons indicating various sizes of printing papers to be displayed (step S103). In addition, in processing of step S103, the same display as shown in FIG. 4A described in the embodiment is displayed on the display screen (a dialog screen of the printer driver) 100 of the display unit 61a of the personal computer 2.

Next, the control unit 64 determines whether the movement manipulation (the drag manipulation) of the icon 301 or 302 onto the document image 200 is detected based on the manipulation signal input from the manipulation unit 61b (a signal showing coordinates of a portion clicked on the display unit 61a by the mouse of the user) (step S104).

Hereinafter, the case in which the control unit 64 detects the drag manipulation of the icon 301 will be exemplarily described.

The control unit 64 controls the display unit 61a such that if the icon 301 is moved on the display screen 100 according to the drag manipulation, in the case of "Yes" in step S104 (for example, when the drag manipulation of the icon 301 is detected) (see FIG. 4B), the control unit 64 causes the frame 400 according to the size of the printing paper indicated by the icon 301 to be displayed while overlapping the document image 200 at a movement position of the icon 301 on the document image 200, and recognizes the region surrounded by the frame 400 as the image region to be printed (the printing region 500) (step S105).

FIG. 4C is an example of the frame 400 displayed on the display screen 100 of the display unit 61a while overlapping the document image 200. While the document image 200 displayed on the display screen 100 is an image reduced from an original document image read through the document reading unit 20 by a certain magnification to fit in the display screen 100, the lengthwise and widthwise sizes (the size of the printing region 500) of the frame 400 are the same size as the vertical A4 size printing paper reduced by the same magnification as the document image 200.

Next, the control unit 64 determines whether the drag manipulation of the frame 400 displayed while overlapping the document image 200 is detected based on the manipulation signal input from the manipulation unit 61b (step S106), performs step S108 in the case of "No" and in the case of "Yes" as shown in FIG. 5A, controls the display unit 61a such that the frame 400 is moved according to the drag manipulation of the frame 400 (step S107).

Next, the control unit 64 determines whether the expansion manipulation or the reduction manipulation of the frame 400 displayed while overlapping the document image 200 is detected based on the manipulation signal input from the manipulation unit 61b (step S108), performs step S110 in the case of "No" and in the case of "Yes" as shown in FIG. 5B, controls the display unit 61a such that the frame 400 is expanded or reduced according to the expansion manipulation or the reduction manipulation of the frame 400 (step S109).

Here, the expansion manipulation means a manipulation of dragging two angles on the diagonal line of the frame 400 outward, and the reduction manipulation means a manipulation of dragging two angles on the diagonal line of the frame 400 inward. In addition, FIG. 5B exemplarily shows the case in which the expansion manipulation of the frame 400 is performed.

Next, the control unit 64 determines whether a rotation manipulation of the frame 400 displayed while overlapping the document image 200 is detected based on the manipulation signal input from the manipulation unit 61b (step S110), performs step S112 in the case of "No" and in the case of "Yes" as shown in FIG. 5C, controls the display unit 61a such that the frame 400 is rotated according to the rotation manipulation of the frame 400 (step S111). Here, the rotation manipulation means a manipulation of dragging at least one angle of the frame 400 in an arc shape.

Then, the control unit 64 determines whether the print instruction icon 600 displayed on the display screen 100 is pressed based on the manipulation signal input from the manipulation unit 61b (whether the print instruction is received) (step S112), returns to step S106 in the case of "No" and in the case of "Yes" outputs the print instruction to a copy machine 1 based on print data generated such that the image of the printing region 500 is printed on the printing paper (in this case, the vertical A4 size printing paper) indicated by the icon 301, which is movement-manipulated (step S113). The copy machine 1 in which the print instruction is received prints the image on the printing paper based on the print instruction and outputs the printed paper as a printed matter.

As described above, according to the embodiment, the user can easily and intuitively designate the printing region 500 by only movement-manipulating the icon 301 or 302 indicating a desired size of printing paper on the display screen 100 of the dialog in the printer driver of the display unit 61a onto the document image 200, which is preview-displayed. That is, according to the embodiment, the user can designate a desired printing region 500 through an easy manipulation without being aware of a task such as trimming.

As described above, while one embodiment of the present disclosure has been described, the present disclosure is not limited thereto but may be variously modified without departing from the scope of the present disclosure.

For example, in the embodiment, while the multifunction machine 1 has been described as the image forming apparatus according to the present disclosure, the present disclosure is not limited thereto but may be applied to another image forming apparatus such as a copy machine.

For example, in the embodiment, while the personal computer 2 has been described as a host apparatus of the image forming system according to the present disclosure, the present disclosure is not limited thereto but may be applied to another host apparatus such as a tablet apparatus having a touch panel, and other terminal apparatuses.

The present disclosure can be applied to an image forming apparatus and an image forming system that enables users to designate a desired printing region (an image region to be printed) through an easy manipulation without being aware of a task such as trimming.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An image forming apparatus comprising:
a display unit configured to display a predetermined image;
a manipulation unit configured to output a manipulation signal according to a manipulation by a user performed on a display screen of the display unit by directly touching the display screen;
a document reading unit configured to generate document image data indicating a document image obtained by reading a document;
a print unit configured to print an image on a printing paper and output the printed paper as a printed matter; and
a control unit configured to cause the document image on the display screen of the display unit to be preview-displayed based on the document image data and cause an icon indicating various sizes of printing papers to be displayed, to cause a frame according to a size of a printing paper indicated by the icon to be displayed while overlapping the document image and recognize a region surrounded by the frame as a printing region, when a movement manipulation which drags the icon onto the document image is detected based on the manipulation signal, and to control the print unit such that an image of the printing region is printed on the printing paper indicated by the icon which is movement-manipulated, when a print instruction is received, wherein
the document image is an image of an original document image reduced by a certain proportion to fit in the display screen,
lengthwise and widthwise sizes of the frame are the same size as a designated size of the printing paper reduced by the same proportion as the document image,
the control unit controls the display unit such that, when an expansion manipulation or a reduction manipulation of the frame displayed while overlapping the document image on the display screen of the display unit is detected based on the manipulation signal, the expansion manipulation dragging two angles on a diagonal line of the frame outward, and the reduction manipulation dragging two angles on a diagonal line of the frame inward, the frame is expanded or reduced relative to the document image based on the expansion manipulation or the reduction manipulation while the document image is not expanded or reduced and is fixed on the display screen, when the image is printed on the designated size of the printing paper after the expansion manipulation of the frame, the image of the printing region is reduced and printed, and when the image is printed on the designated size of the printing paper after the reduction manipulation of the frame, the image of the printing region is expanded and printed, the control unit controls the display unit such that, when a rotation manipulation of the frame displayed while overlapping the document image on the display screen of the display unit based on the manipulation signal is detected, the frame is rotated according to the rotation manipulation while the document image is not rotated and is fixed on the display screen, and when the image is printed on the designated size of the printing paper after the rotation manipulation of the frame, the image of the printing region is rotated the same angle as the rotation angle of the frame in a reverse direction to the rotation direction of the frame with respect to the vertical axis of the printing paper, and printed.

2. The image forming apparatus according to claim 1, wherein
the control unit controls the display unit such that, when a movement manipulation of the frame displayed overlapping the document image on the display screen of the display unit based on the manipulation signal is detected, the frame is moved according to the movement manipulation.

3. The image forming apparatus according to claim 2, wherein
the control unit controls the display unit such that, when a rotation manipulation of the frame displayed while overlapping the document image on the display screen of the display unit based on the manipulation signal is detected, the frame is rotated according to the rotation manipulation.

4. The image forming apparatus according to claim 1, wherein
the manipulation unit is a touch panel disposed opposite to the display screen of the display unit, and outputs a signal indicating coordinates of a portion pressed by a user as the manipulation signal.

5. An image forming system comprising:
an image forming apparatus configured to print an image onto a printing paper and output the printed paper as a printed matter;
a host apparatus configured to output a print instruction to the image forming apparatus; and
a communication line configured to connect the host apparatus and the image forming apparatus to each other, wherein the host apparatus comprises:
a display unit configured to display a predetermined image;
a manipulation unit configured to output a manipulation signal according to a manipulation by a user performed on a display screen of the display unit by directly touching the display screen;
a storage unit configured to store image data of an image to be printed; and
a control unit configured to cause the image on the display screen of the display unit to be preview-displayed based on the image data and cause an icon indicating various sizes of printing papers to be displayed, to cause a frame according to a size of a printing paper indicated by the icon to be displayed while overlapping the image and recognize a region surrounded by the frame as a printing region, when a movement manipulation which drags the icon onto the image is detected based on the manipulation signal, and to output the print instruction to the image forming apparatus such that an image of the printing region is printed on the printing paper indicated by the icon which is movement-manipulated, wherein the image is an image of an original image reduced by a certain proportion to fit in the display screen, lengthwise and widthwise sizes of the frame are the same size as a designated size of the printing paper reduced by the same proportion as the image, the control unit controls the display unit such that, when an expansion manipulation or a reduction manipulation of the frame displayed while overlapping the image on the display screen of the display unit is detected based on the manipulation signal, the expansion manipulation dragging two angles on a diagonal line of the frame outward, and the reduction manipulation dragging two angles on a diagonal line of the frame inward, the frame is expanded or reduced relative to the document image based on the expansion manipulation or the reduction manipulation while the document image is not expanded or reduced and is fixed on the display screen, and when the image is printed on the designated size of the printing paper after the expansion manipulation of the frame, the image of the printing region is reduced and printed, and when the image is printed on the designated size of the printing paper after the reduction manipulation of the frame, the image of the printing region is expanded and printed, the control unit controls the display unit such that, when a rotation manipulation of the frame displayed while overlapping the document image on the display screen of the display unit based on the manipulation signal is detected, the frame is rotated according to the rotation manipulation while the document image is not rotated and is fixed on the display screen, and when the image is printed on the designated size of the printing paper after the rotation manipulation of the frame, the image of the printing region is rotated the same angle as the rotation angle of the frame in a reverse direction to the rotation direction of the frame with respect to the vertical axis of the printing paper, and printed.

* * * * *